(12) United States Patent (10) Patent No.: US 12,646,341 B2

Hiraoka (45) Date of Patent: Jun. 2, 2026

(54) IMAGE PROCESSING METHOD AND IMAGE PROCESSING PROGRAM

(71) Applicant: TOPPAN Inc., Taito-ku (JP)

(72) Inventor: Yasuyuki Hiraoka, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 434 days.

(21) Appl. No.: 18/317,170

(22) Filed: May 15, 2023

(65) Prior Publication Data

US 2023/0282008 A1     Sep. 7, 2023

Related U.S. Application Data

(63) Continuation of application No. PCT/JP2021/038984, filed on Oct. 21, 2021.

(30) Foreign Application Priority Data

Nov. 17, 2020     (JP) ................................. 2020-190809

(51) Int. Cl.
　　*G06V 20/69*　　　(2022.01)
　　*G06V 10/20*　　　(2022.01)
　　　　　(Continued)

(52) U.S. Cl.
　　CPC .......... *G06V 20/695* (2022.01); *G06V 10/245* (2022.01); *G06V 10/255* (2022.01);
　　　　　(Continued)

(58) Field of Classification Search
　　CPC .. G06V 20/695; G06V 10/245; G06V 10/255; G06V 10/273; G06V 10/52;
　　　　　(Continued)

(56) References Cited

U.S. PATENT DOCUMENTS 10,863,897 B2     12/2020     Aisaka et al.
2018/0355308 A1     12/2018     Matsusaki et al.

FOREIGN PATENT DOCUMENTS

JP　　　2014-054362 A　　　3/2014
JP　　　2019-33745 A　　　3/2019
　　　　　(Continued)

OTHER PUBLICATIONS

Montoya-Zegarra, Javier A., et al. "AutoTube: a novel software for the automated morphometric analysis of vascular networks in tissues." Angiogenesis 22.2 (2019): 223-236. (Year: 2019).*
(Continued)

*Primary Examiner* — Gregory A Morse

*Assistant Examiner* — Renae A Bitor

(74) *Attorney, Agent, or Firm* — Oblon, McClelland, Maier & Neustadt, L.L.P.

(57)　　　　　ABSTRACT

An image processing method includes acquiring an image in which a cell structure having a stained vascular network structure is imaged, applying a wavelet transform to the image such that a contour image in which contours of the vascular network structure are extracted is generated, and repeatedly excluding object pixels from object boundaries recognized in the contour image such that a skeleton image in which skeletons having a line width of a predetermined number of pixels are extracted is generated.

20 Claims, 10 Drawing Sheets

(51) Int. Cl.

| | | |
|---|---|---|
| *G06V 10/24* | (2022.01) | |
| *G06V 10/26* | (2022.01) | |
| *G06V 10/52* | (2022.01) | |

(52) U.S. Cl.
CPC ............ *G06V 10/273* (2022.01); *G06V 10/52* (2022.01); *G06V 20/693* (2022.01); *G06V 20/698* (2022.01); *G06V 2201/033* (2022.01)

(58) Field of Classification Search
CPC ............... G06V 20/693; G06V 20/698; G06V 2201/033; G06V 10/26; G06V 20/69; G06T 7/168; G06T 2207/10024; G06T 2207/10056; G06T 2207/20044; G06T 2207/20064; G06T 2207/30101; G06T 7/155; G06T 7/13
See application file for complete search history.

(56) References Cited

FOREIGN PATENT DOCUMENTS

| WO | WO2011/047342 A1 | 4/2011 |
|---|---|---|
| WO | WO 2012/026597 A1 | 3/2012 |
| WO | 2013-508035 A | 3/2013 |
| WO | WO 2017/146124 A1 | 8/2017 |
| WO | WO 2019/171986 A1 | 9/2019 |
| WO | WO 2019/230643 A1 | 12/2019 |

OTHER PUBLICATIONS

Jelinek, Herbert F., et al. "Automated segmentation of retinal blood vessels and identification of proliferative diabetic retinopathy." Journal of the Optical Society of America A 24.5 (2007): 1448-1456. (Year: 2007).*

Fathi, A., & Naghsh-Nilchi, A. R. (2013). Automatic wavelet-based retinal blood vessels segmentation and vessel diameter estimation. Biomedical Signal Processing and Control, 8(1), 71-80. (Year: 2013).*

Sasaki, Kazuki, et al. "Construction of three-dimensional vascularized functional human liver tissue using a layer-by-layer cell coating technique." Biomaterials 133 (2017): 263-274. (Year: 2017).*

Extended European Search Report issued Feb. 21, 2024 in European Patent Application No. 21894418.9, 10 pages.

Jelinek, H. et al., "Automated Segmentation of Retinal Blood Vessels and Identification of Proliferative Diabetic Retinopathy", Journal of the Optical Society of America A, vol. 24, No. 5, May 2007, XP093128262, 10 pages.

Fathi, A. et al., "Automatic Wavelet-based Retinal Blood Vessels Segmentation and Vessel Diameter Estimation", Biomedical Signal Processing and Control, vol. 8, 2013, XP093127964, pp. 71-80.

Sasaki, K. et al., "Construction of Three-dimensional Vascularized Functional Human Liver Tissue using a Layer-by-layer Cell Coating Technique", Biomaterials, vol. 133, 2017, XP085000737, pp. 263-274.

International Search Report issued Jan. 25, 2022 in International Application No. PCT/JP2021/038984, filed Oct. 21, 2021, 5 pages (with English Translation).

Japanese Office Action issued Oct. 7, 2025, in corresponding Japanese Patent Application No. 2024-230400, 6 pages.

* cited by examiner

FIG. 1

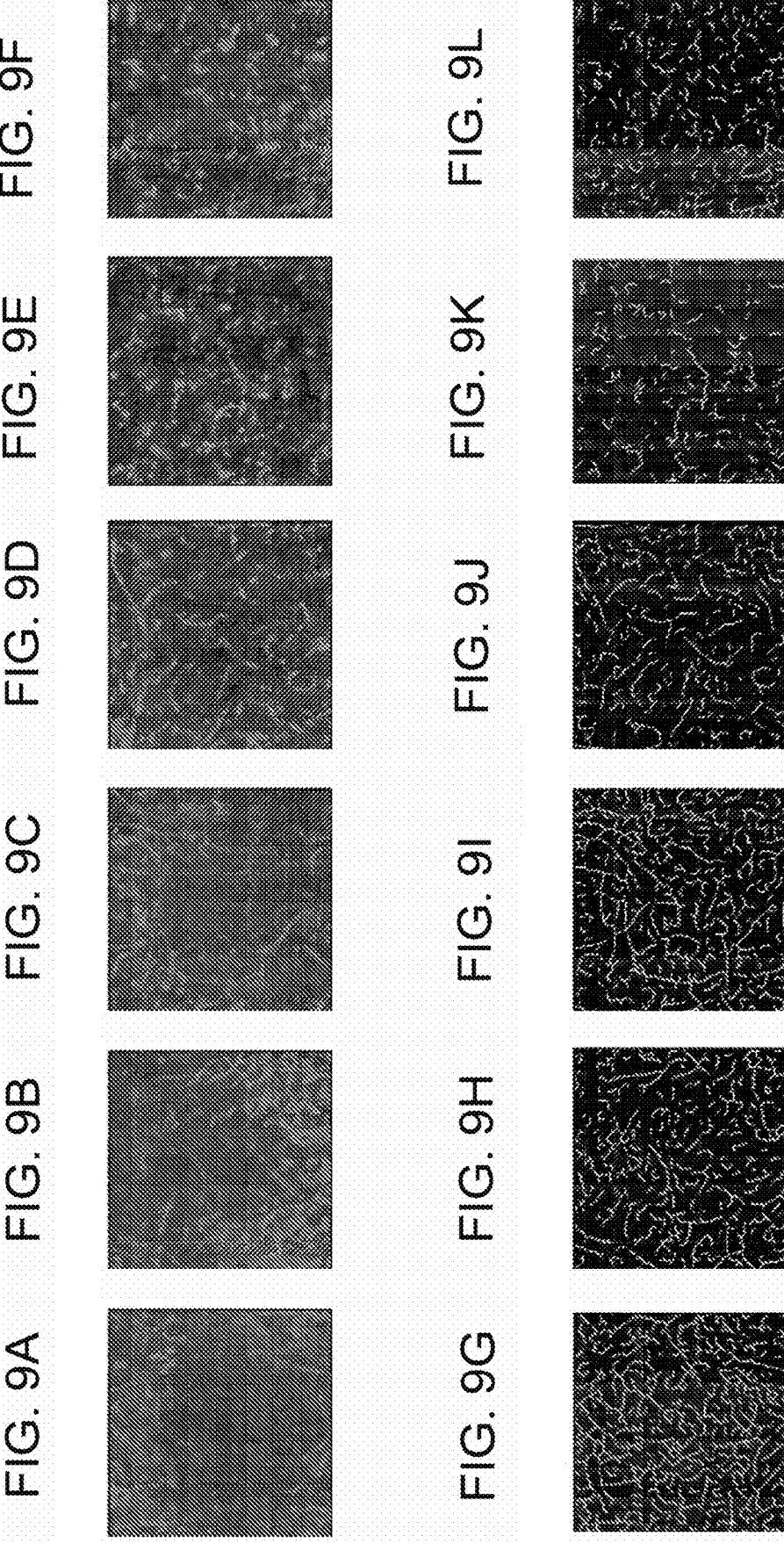

IMAGE PROCESSING METHOD AND IMAGE PROCESSING PROGRAM

CROSS-REFERENCE TO RELATED APPLICATIONS

The present application is a continuation of International Application No. PCT/JP2021/038984, filed Oct. 21, 2021, which is based upon and claims the benefits of priority to Japanese Application No. 2020-190809, filed Nov. 17, 2020. The entire contents of these applications are incorporated herein by reference.

BACKGROUND OF THE INVENTION

Field of the Invention

The present disclosure relates to image processing methods and image processing programs.

Description of Background Art

WO2017/146124 describes an artificial cell structure having a vascular network structure. The entire contents of this publication are incorporated herein by reference.

SUMMARY OF THE INVENTION

According to one aspect of the present invention, an image processing method includes acquiring an image in which a cell structure having a stained vascular network structure is imaged, applying a wavelet transform to the image such that a contour image in which contours of the vascular network structure are extracted is generated, and repeatedly excluding object pixels from object boundaries recognized in the contour image such that a skeleton image in which skeletons having a line width of a predetermined number of pixels are extracted is generated.

According to another aspect of the present invention, a non-transitory computer-readable medium is stored thereon a program that when executed, causes a computer to execute an image processing method including acquiring an image in which a cell structure having a stained vascular network structure is imaged, applying a wavelet transform to the image such that a contour image in which contours of the vascular network structure are extracted is generated, and repeatedly excluding object pixels from object boundaries recognized in the contour image such that a skeleton image in which skeletons having a line width of a predetermined number of pixels are extracted is generated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram illustrating an example function of an image processing system including an image processing device according to an embodiment of the present invention;

FIGS. 9A-9L are diagrams in which 9A to 9F are example captured images of a cell structure to which cyclophosphamide is administered, and 9G to 9L are example extracted images corresponding to the respective captured images of a cell structure to which cyclophosphamide is administered.

DETAILED DESCRIPTION OF THE EMBODIMENTS

Figure 2:
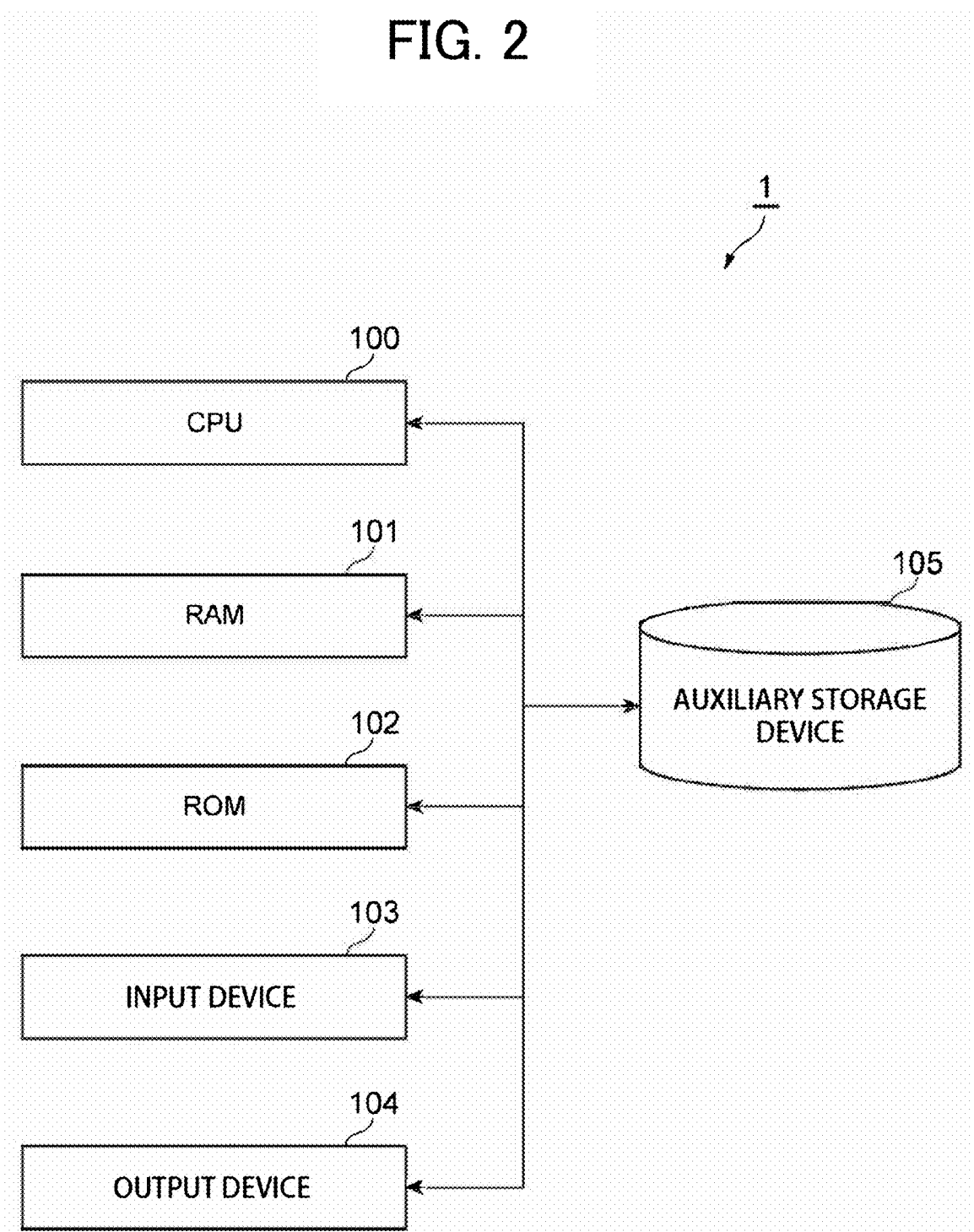
FIG. 2 is a block diagram illustrating an example hardware configuration of an image processing device.

Embodiments will now be described with reference to the accompanying drawings, wherein like reference numerals designate corresponding or identical elements throughout the various drawings.

Outline of Cell Structure

First, a cell structure to be imaged by an image processing device according to an embodiment will be outlined. Examples of the cell structure includes vascular endothelial cells, and a specific example thereof may be three-dimensional hepatic organoids (3D hepatic model). The 3D hepatic model contains stromal cells including vascular endothelial cells and is a tissue capable of being used for evaluating hepatotoxicity. For example, the 3D hepatic model includes hepatocytes and also includes stromal cells, which include vascular endothelial cells and at least one type of cells selected from the group of fibroblasts (for example, hepatic stellate cells), immune cells, and smooth muscle cells. The cell structure may further include an extracellular matrix component that functions as a scaffold for cells, and other components that support formation of the cell structure (for example, polyelectrolytes).

The term "extracellular matrix component" as used herein refers to an aggregate of extracellular matrix molecules formed of multiple extracellular matrix molecules. The extracellular matrix refers to substances that exist outside the cells in a living organism. The extracellular matrix may be any substance as long as it does not affect the growth of cells and formation of cell aggregates. Specific examples thereof include, but are not limited to, collagen, elastin, proteoglycan, fibronectin, hyaluronic acid, laminin, vitronectin, tenascin, entactin, fibrillin and cadherin. These extracellular matrix components may be used singly or in combination thereof. For example, the extracellular matrix component may contain a collagen component or may be a collagen component. When the extracellular matrix component is a collagen component, the collagen component functions as a scaffold for cell adhesion, further promoting formation of a three-dimensional cell structure. The extracellular matrix component in the present embodiment is preferably a substance present outside an animal cell, that is, an extracellular matrix component of an animal. Further, the extracellular matrix molecule may be a modified form or a variant of the above-mentioned extracellular matrix molecules or may be a polypeptide such as a chemically synthesized peptide as long as it does not affect the growth of cells and formation of cell aggregates.

The extracellular matrix component may have repeats of the sequence represented by Gly-X-Y which is characteristic of collagen. Here, Gly represents a glycine residue, and X and Y each independently represent an arbitrary amino acid residue. Multiple Gly-X-Y sequences may be the same or may be different from each other. Having the repeats of the sequence represented by Gly-X-Y reduces restrictions on the arrangement of molecular chains, further improving the function as a scaffold. In the extracellular matrix component having the repeats of the sequence represented by Gly-X-Y, the proportion of the sequence represented by Gly-X-Y may be 80% or more and preferably 95% or more of the entire amino acid sequence. Further, the extracellular matrix component may have an RGD sequence. The RGD sequence refers to a sequence represented by Arg-Gly-Asp (arginine residue-glycine residue-aspartic acid residue). When the extracellular matrix component has an RGD sequence, cell adhesion is further promoted, which is more suitable as a scaffold. Examples of the extracellular matrix component containing the sequence represented by Gly-X-Y and the RGD sequence include collagen, fibronectin, vitronectin, laminin, cadherin, and the like.

The extracellular matrix component may have a fibrous shape, for example. The term "fibrous" refers to a shape formed of fiber-like extracellular matrix components or a shape formed of fiber-like extracellular matrix components crosslinked between molecules. At least part of the extracellular matrix components may be fibrous. The shape of the extracellular matrix component is a shape of an aggregation of extracellular matrix components (aggregate of extracellular matrix components) observed in microscopic observation, and the extracellular matrix component preferably has a size with an average diameter and/or an average length described later. The fibrous extracellular matrix component further includes a fine fiber-like substance formed by aggregation of multiple fiber-like extracellular matrix molecules (thin fibers), a fiber-like substance formed of an aggregation of thin fibers, defibrated fiber-like substances, and the like. When the extracellular matrix component having a fibrous shape is contained, the RGD sequence is preserved without being destroyed in the fibrous extracellular matrix component and can further effectively function as a scaffold for cell adhesion.

Polyelectrolytes, which are components that support the formation of cell structure, are polymer compounds having electrolyte properties. Examples of polyelectrolytes include, but are not limited to, glycosaminoglycans such as heparin, chondroitin sulfate (e.g., chondroitin 4-sulfate, or chondroitin 6-sulfate), heparan sulfate, dermatan sulfate, keratan sulfate, hyaluronic acid, and the like; dextran sulfate, rhamnan sulfate, fucoidan, carrageenan, polystyrene sulfonic acid, polyacrylamide-2-methylpropanesulfonic acid, polyacrylic acid, and derivatives thereof. The polyelectrolytes may be composed of one of the above or may contain a combination of two or more.

The polyelectrolytes are preferably composed of glycosaminoglycan, more preferably contain at least one selected from the group of heparin, dextran sulfate, chondroitin sulfate and dermatan sulfate, and are still more preferably composed of heparin. When the cell structure contains polyelectrolytes, excessive aggregation of extracellular matrix components can be effectively suppressed, and as a result, a cell structure excellent in responsiveness to substances having hepatotoxicity can be more easily obtained. When the cell structure contains heparin, the above effect is further enhanced.

The vascular network structure of the cell structure becomes visible by subjecting the 3D hepatic model to immunostaining, fluorescent modification, or a combination of immunostaining and fluorescent modification. Further, by administering a compound such as cyclophosphamide to the 3D hepatic model in which the vascular network structure has become visible, the degree of damage to the vascular network structure can be observed.

More specifically, the 3D hepatic model (cell structure) in which the vascular network to be imaged by the image processing device is stained can be obtained by performing a preparation process of preparing a 3D hepatic model, an administration process of administering a compound to the 3D hepatic model, and a stain control process of staining the 3D hepatic model. If the degree of damage to the vascular network structure is not observed, that is, if a compound is not administered to the 3D hepatic model, the administration process may not be performed.

Table 1 shows an example of cultured cells cultured in an image processing system 2. The preparation process is performed using methods and materials disclosed in, for example, WO 2017/146124 or WO 2018/143286. The preparation process of the present embodiment is an example using the method disclosed in WO 2017/146124. The preparation process may include, for example, a first collection process of collecting cells other than fresh human hepatocytes isolated from chimeric mice with human hepatocytes (PXB cell) shown in Table 1, a second collection process of collecting PXB cells, a mixture obtaining process of obtaining a cell mixture, a suspension obtaining process of obtaining a cell suspension, a gel formation process of forming a fibrin gel, and a model obtaining process of obtaining a 3D model.

TABLE 1

| Cell line | Origin/tissue | Manufacturer | Model No. | Culture medium |
|---|---|---|---|---|
| Lx2 | Human hepatic stellate cells | MerckMillipore | SCC064 | D-MEM (with 2% (v/v) FBS, 1% (v/v) P/S) |
| SEC | Human hepatic sinusoidal endothelial cells | SCIENCELL | 5000 | ECM |
| PXB cell | Fresh human hepatocytes isolated from chimeric mice with human hepatocytes | Phoenix Bio | PPC-T25 | HCGM |

Table 2 shows an example of reagents and consumables used in the image processing system. In Table 2, general-purpose research materials such as a disposable pipette are omitted. In the first collection process, for example, the operator prepares purchased human hepatic stellate cells (Lx2) and human hepatic sinusoidal endothelial cells (SEC)

and measures the quantity of cells. For example, in the first collection process, the operator may thaw frozen stock of cells of the human hepatic stellate cells (Lx2) and human hepatic sinusoidal endothelial cells (SEC), culture them without subculture according to the protocol recommended by the manufacturer, collect them from the culture flask and dish using trypsin according to a conventional method, and then measure the quantity of cells. In the second collection process, for example, the operator prepares purchased PXB cells, and measures the quantity of cells of the PXB cells.

tion (solvent: HCM) are mixed on a 48-well plate. For example, the solvent added to the viscous solution after the supernatant is removed from the viscous solution in the suspension obtaining process may be the 20 U/mL thrombin solution (solvent: HCM). In this case, for example, after a droplet of the 10 mg/ml fibrinogen solution is formed, the cell suspension obtained in the suspension obtaining process may be added into the droplet. Alternatively, for example, the 10 mg/mL fibrinogen solution may be added after 2 μL of the cell suspension obtained in the suspension obtaining

TABLE 2

| Type | Description | Manufacturer | Note |
|---|---|---|---|
| Medium | DMEM | NACALAI TESQUE | High glucose |
| Medium | ECM | Sciencell | |
| Medium | HCGM | Phoenix Bio | |
| Medium | HCM | Lonza | |
| Reagent | FBS: Fetal bovine serum | Thermo Fisher | |
| Reagent | p/s: penicillin streptomycin solution | FUJIFILM Wako | |
| Reagent | Heparin (hydrochloride) | Sigma-Aldrich | Derived from porcine intestinal mucosa |
| Reagent | Collagen | Nippi | Type I, derived from bovine dermis |
| Reagent | Acetic acid | FUJIFILM Wako | |
| Reagent | Tris (hydrochloride) | Sigma-Aldrich | |
| Reagent | PBS: phosphate buffer saline | NACALAI TESQUE | |
| Reagent | 0.05% Triton-containing TBS | NACALAI TESQUE | |
| Reagent | Cholyl-Lysyl-Fluorescein (CLF) | CORNING | |
| Reagent | 0.25% trypsin-EDTA | FUJIFILM Wako | |
| Reagent | Trypan blue | Invitrogen | |
| Reagent | 4% paraformaldehyde-phosphate buffer solution | FUJIFILM Wako | |
| Reagent | DMSO: dimethyl sulfoxide | NACALAI TESQUE | |
| Reagent | TRITON X-100 | MP Biomedicals | |
| Reagent | BSA: bovine serum albumin | Thermo Fisher | |
| Reagent | Hoechst 33342 | Sigma-Aldrich | |
| Reagent | CellTiter-Glo ® 3D Cell Viability Assay | Promega | |
| Reagent | Fibrinogen from bovine plasma. Type I-S powder | SIGMA | |
| Reagent | Thrombin from bovine plasma | SIGMA | |
| Reagent | Live/Dead Cell Staining Kit II | PROMOCELL | |
| Reagent | Endothelial Cells Growth Supplement | Sciencell | |
| Antibody | Mouse anti-CD31 antibody | DAKO | |
| Antibody | Alexa647 label anti-mouse IgG secondary antibody | Thermo Fisher | Host: goat |
| Material | 48-well plate | IWAKI | |
| Material | 96-plate for luminescence measurement | CORNING | |

In the mixture obtaining process, for example, the cells collected in the first collection process and the second collection process are mixed so that a total quantity of cells per well becomes 30,000 cells at the cell ratios of PXB cells, SEC and Lx2 in the tissue of 65%, 25% and 10%, respectively, to obtain a cell mixture (an example of cell structure). The cell mixture contains multiple types of cells including vascular endothelial cells and other stromal cells.

In the suspension obtaining process, first, for example, a heparin-collagen solution is prepared by mixing equal amounts of a 1.0 mg/ml heparin solution (buffer: 100 mM Tris-HCL) and a 0.3 mg/ml collagen solution (buffer: 5 mM acetate). Then, 100 μL of the heparin-collagen solution prepared as described above is added to each cell mixture obtained in the mixture obtaining process, and the mixture is suspended until the cells are no longer visually observable and then centrifuged (400 g×2 min) to obtain a viscous solution. After the supernatant is removed from the viscous solution, a solvent is added to the viscous solution so that the final volume of the viscous solution becomes the solution amount of [the number of wells to be seeded]×2 μL. Thus, a cell suspension is obtained.

In the gel formation process, for example, the cell suspension obtained in the suspension obtaining process, a 10 mg/mL fibrinogen solution, and a 20 U/mL thrombin soluprocess is seeded to form a droplet. The solvent added to the viscous solution in the suspension obtaining process may not necessarily be the 20 U/mL thrombin solution (solvent: HCM). In this case, in the gel formation process, for example, the 20 U/mL thrombin solution (solvent: HCM) may be added to the droplet obtained by mixing the cell suspension and 10 mg/mL fibrinogen solution. The order of mixing the cell suspension, the 10 mg/mL fibrinogen solution, and the 20 U/mL thrombin solution (solvent: HCM) is not limited to the above and may be any order. The droplets obtained by mixing the cell suspension, the 10 mg/mL fibrinogen solution, and the 20 U/mL thrombin solution (solvent: HCM) are allowed to stand in an incubator for 40 minutes to form a fibrin gel. The gel formation process may not necessarily be performed if a model does not need to be formed into a predetermined lump shape.

In the model obtaining process, for example, 0.5 mL of the HCM (containing endothelial cell growth supplement) is added to each well in which the fibrin gel is formed in the gel formation process to obtain a 3D model. Thus, the preparation process is completed. Further, in the mixture obtaining process, the suspension obtaining process, the gel formation process and the model obtaining process in the preparation process, the values of the total quantity of cells, the cell ratio in the tissue, the concentration of the reagent, the amount of reagent solution, the centrifugation time, the standing time, and the like are not limited to the above values, and may be changed as appropriate depending on the cell structure to be prepared.

Next, the administration process is performed. In the administration process, the 3D hepatic model prepared in the preparation process is administered with a compound by replacing the medium with each medium containing monocrotaline at concentrations of 2000 μM, 666 μM, 222 μM, 74 μM on day 1 and day 4. As each compound is dissolved in DMSO (dimethyl sulfoxide) at a high concentration and stored, the DMSO is contained in the medium at the concentration of 1% in the administration process. Further, since 1% DMSO is contained in each administration condition, medium exchange with a medium containing only 1% DMSO is also performed as a negative control. Thus, the administration step is completed.

Next, the stain control process is performed. As an example, the stain control process includes fixation, permeabilization, primary antibody treatment and secondary antibody treatment.

In the fixation, 48-well plate is removed from the incubator on day 6, followed by removal of medium and washing with PBS. After the washing, 300 μL of 4% paraformaldehyde-phosphate buffer solution (PFA) is added to each well to fix the 3D model. After the fixation, the PFA is washed away.

Then, in the permeabilization, 100 μL of a 0.2 (v/v) % TRITON/i (w/v)/BSA PBS solution (BSA solution) is added to the insert of each well, and allowed to stand at room temperature for 2 hours.

Then, in the primary antibody treatment, a mouse-derived anti-CD31 antibody is diluted 100-fold with the BSA solution to obtain a primary antibody solution. 100 μL of the primary antibody solution is added to the insert of each well and allowed to stand at 4° C. for 24 hours. After standing, the primary antibody solution is washed away.

Then, in the secondary antibody treatment, a secondary antibody is diluted 200-fold with a BSA solution to obtain a secondary antibody solution. 100 μL of the secondary antibody solution is added to the insert of each well and allowed to stand at room temperature for 1 hours while being shielded from light. After the standing, the secondary antibody solution is washed away, and 100 μL of PBS is added to each well. Thus, the stain control process is completed, and a 3D hepatic model in which the vascular network structure is stained can be obtained. The stain control process may be performed by a known method, for example.

Image Processing System

Figure 1:
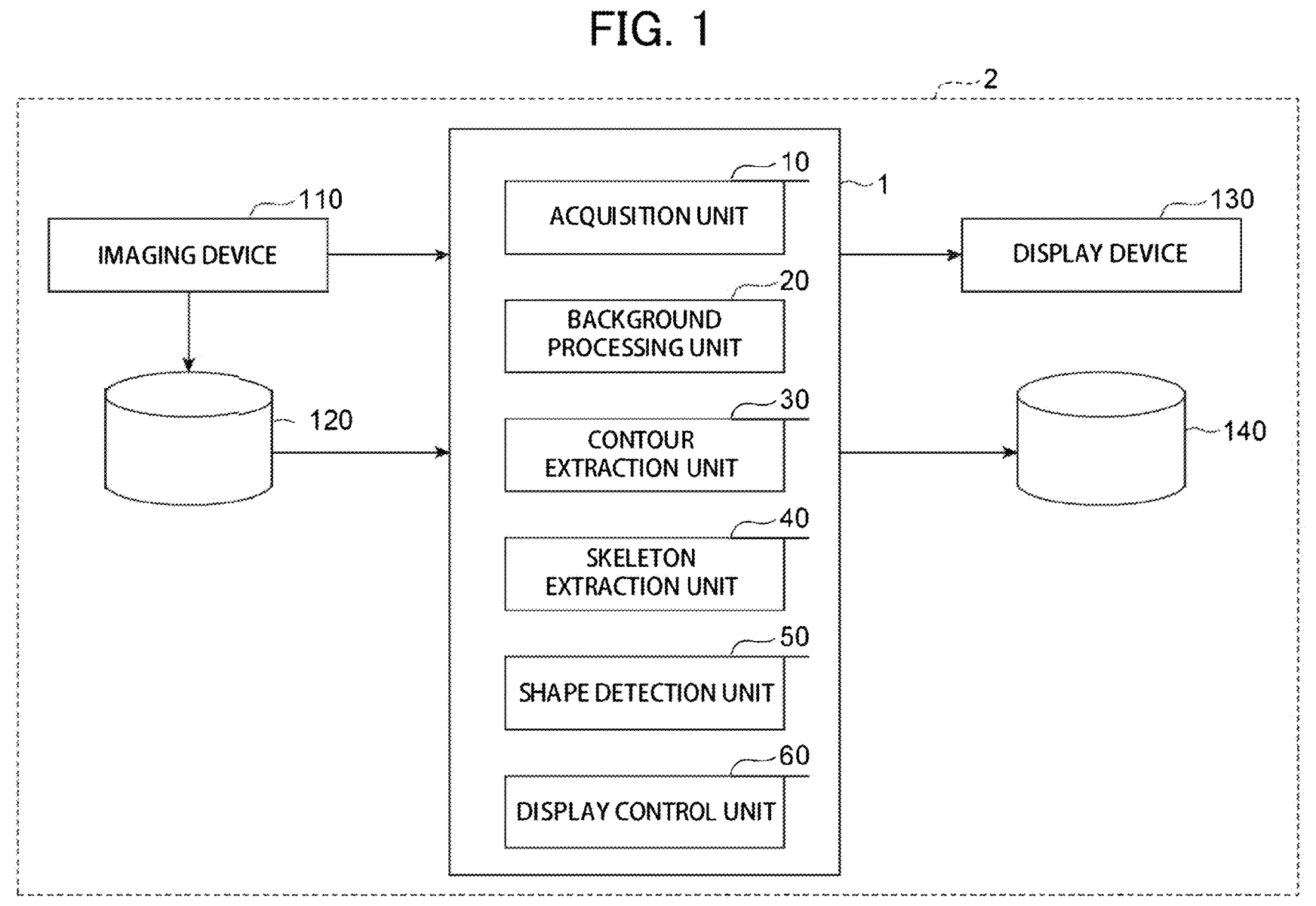

FIG. 1 is a block diagram illustrating an example function of an image processing system including an image processing device according to an embodiment. As shown in FIG. 1, the image processing system 2 includes an image processing device 1, an imaging device 110, a first storage device 120, a display device 130 and a second storage device 140. Each of the imaging device 110, the first storage device 120, the display device 130 and the second storage device 140 are communicable with the image processing device 1.

The imaging device 110 is a device for imaging a 3D hepatic model having a stained vascular network structure. The imaging device 110 may be, for example, a confocal microscope. The imaging device 110 may use, for example, a 4× lens, set the imaging mode to a non-confocal mode with a large focal depth, set the filter to 647(Ex)/512(EM), and image the 3D hepatic model with the Z axis position set in a range of 0 to 100 μm in 10 μm increments. The imaging device 110 images a region including the center of the 3D hepatic model. The imaging device 110 acquires a captured image, which is an image of the 3D hepatic model, by summing the intensities of the pixel values, color tones, and the like of multiple images with different Z axis positions of the confocal microscope for each 3D hepatic model imaged. An example of the pixel value is a luminance value. The captured image includes a region in which the stained vascular network structure is present.

The imaging device 110 has a function of outputting a captured image to at least one of the image processing device 1 and the first storage device 120. The first storage device 120 may be, for example, a storage medium such as a hard disk. The first storage device 120 stores the captured image described above. The first storage device 120 may store previously imaged images.

The image processing device 1 acquires an image of the cell structure and generates an image in which the shape of the vascular network structure of the cell structure is recognizable. First, hardware of the image processing device 1 will be described. FIG. 2 is a block diagram illustrating an example hardware configuration of an image processing device according to an embodiment. As shown in FIG. 2, the image processing device 1 is configured as a typical computer system including a main storage device such as a CPU (Central Processing Unit) 100, a ROM (Read Only Memory) 101 and a RAM (Random Access Memory) 102, an input device 103 such as a camera or a keyboard, an output device 104 such as a display, and an auxiliary storage device 105 such as a hard disk.

The functions of the image processing device 1 are implemented by causing the hardware such as the CPU 100, the ROM 101 and the RAM 102 to read predetermined computer software and operate the input device 103 and the output device 104 under the control of the CPU 100 while reading and writing data in the main storage device and the auxiliary storage device 105. The image processing device 1 may include a communication module, and the like.

Referring back to FIG. 1, the image processing device 1 includes an acquisition unit 10, a background processing unit 20, a contour extraction unit 30, a skeleton extraction unit 40, a shape detection unit 50 and a display control unit 60.

The acquisition unit 10 may acquire, for example, a captured image of a 3D hepatic model having a stained vascular network structure from the imaging device 110. The acquisition unit 10 may acquire a captured image from the first storage device 120 by referring the first storage device 120. The acquisition unit 10 may acquire multiple images with different Z axis positions of the confocal microscope from the imaging device 110 and acquire a captured image by summing the intensities of the pixel values, color tones, and the like of the plurality of images instead of the imaging device 110.

The background processing unit 20 has a cutout function of cutting out the center part of the 3D hepatic model imaged in the captured image, a conversion function of converting the cutout image into a gradation image which is an image with a predetermined gradation, and a removal function of removing a background signal and a noise of the image.

As the cutout function, the background processing unit 20 generates an image obtained by extracting a region including the center of the 3D hepatic model from the captured image. The region including the center of the 3D hepatic model may not necessarily include, for example, the periphery of the 3D hepatic model and the background of the 3D hepatic model. The background processing unit 20 may generate, for example, a cutout image which is an image obtained by cutting out a 1 mm square region including the center of the 3D hepatic model from the captured image. The cutout image includes the vascular network structure of the 3D hepatic model.

As the conversion function, the background processing unit 20 converts the cutout image into a gradation image with a predetermined gradation. Examples of the predetermined gradation include 8 gradations, 16 gradations, 256 gradations, and the like. As an example, the background processing unit 20 converts the cutout image into a gradation image of 8-bit grayscale. The vascular network structure stained in the cutout image has high pixel values, and thus can be converted into white in the gradation image. The region other than the vascular network structure in the cutout image has low pixel values, and thus can be converted into black in the gradation image.

As the removal function, the background processing unit 20 generates a removed image which is an image obtained by removing a background signal of the gradation image. The background processing unit 20 may remove a background signal by, for example, a rolling ball method or a sliding paraboloid method. The radius of a ball or a paraboloid may be, but is not limited to, 20 pixels. Accordingly, the background signal of the gradation image is removed and the pixel values of the vascular network structure are normalized.

The background processing unit 20 generates an adjusted image which is an image obtained by reducing the noise of the removed image. The background processing unit 20 adjusts the contrast of the removed image, and then reduces the noise by subtracting a predetermined pixel value. The background processing unit 20 may expand the removed image to, for example, 256 gradations while maintaining the distribution of pixel values of the pixels of the removed image. As an example, the background processing unit 20 adjusts the pixel values of the pixels having the minimum pixel value in the removed image to 0 (minimum value) and the pixel values of the pixels having the maximum pixel value in the removed image to 255 (maximum value), and then generates an image in which the pixel values of the pixels are distributed according to a distribution similar to the distribution of the pixel values of the pixels before the adjustment. This function can increase the difference between pixel values of the pixels indicating the vascular network structure having high pixel values and the pixels indicating noise having low pixel values in the removed image. Then, the background processing unit 20 subtracts a predetermined pixel value from the pixel values in the image having the new distribution. In the case of a 256-gradation image, for example, 100 may be subtracted from the pixel values, but the predetermined pixel value is not limited to 100. Thus, by increasing the difference between pixel values of the pixels indicating the vascular network structure and the pixels indicating the noise and then subtracting a predetermined pixel value, only the noise can be effectively removed.

Alternatively, the background processing unit 20 may adjust the distribution of the pixel values to be uniform instead of normalizing them, and then subtract a predetermined pixel value from the pixel values in the image having the new distribution. Further, the background processing unit 20 may reduce the noise by applying a filter such as a maximum value filter, a minimum value filter or a smoothing filter to the image from which the background signal has been removed.

The contour extraction unit 30 applies the wavelet transform to the adjusted image to thereby generate a contour image in which contours of the vascular network structure are extracted. The wavelet transform extracts contours of a subject included in the image. As the wavelet transform, the contour extraction unit 30 decomposes the adjusted image into wavelet coefficients (high frequency components) and scaling function coefficients (low frequency components). The contour extraction unit 30 repeats the above decomposition to the decomposed image, extracts high frequency components at each level, and combines them into a single image.

The contour extraction unit 30 generates a binarized contour image from the combined image by setting the intensities of pixels having a pixel value less than a threshold to 0 and the intensities of pixels having a pixel value higher than or equal to the threshold to 1. The threshold may be determined in advance based on, for example, the properties of the sample, observation conditions in measurement, and the like. The wavelet transform may be performed by, for example, a Mexican hat filter. Since the vascular network structure is represented by pixels having high pixel values in the adjusted image, it can be easily extracted as high frequency components compared with pixels of other subjects (elements) having low pixel values. Accordingly, in the contour image generated by the contour extraction unit 30, the pixels that correspond to the vascular network structure are represented as object pixels having the intensity of 1, and the pixels that do not correspond to the vascular network structure are represented as pixels having the intensity of 0.

The skeleton extraction unit 40 repeatedly excludes object pixels from object boundaries recognized in the contour image to thereby generate a skeleton image in which skeletons having a line width of a predetermined number of pixels are extracted. The skeleton extraction unit 40 recognizes an object region, which is a region in which multiple object pixels are gathered in the binarized contour image, as a region in which the vascular network structure is present, and repeatedly excludes the object pixels from the boundary of the object region. The exclusion may refer to, for example, setting the intensities of the object pixels to 0.

The boundary of the object region may refer to, for example, object pixels in the object region when neighboring pixels on any of the above, below, left or right do not correspond to the vascular network structure and have the intensity of 0. The skeleton extraction unit 40, when setting the predetermined number of pixels to 1, for example, repeatedly excludes the boundary of the object region until the line width of the object region is represented by 1 pixel. For example, focusing on an object pixel (first object pixel) located at the boundary of the object region, if the first object pixel has a neighboring object pixel (second object pixel) on the above or below and another neighboring object pixel (third object pixel) on the left or right while the second object pixel and the third object pixel each have a neighboring object pixel (fourth object pixel), the first object pixel is removed. The skeleton extraction unit 40 generates a skeleton image in which the skeletons are present by sets of the object pixels such that the line width of all the object regions present in the contour image is 1 pixel. The predetermined number of pixels is not limited to 1, and an appropriate numerical value can be set.

The shape detection unit 50 detects the shape of the vascular network structure based on the skeletons present in the skeleton image. The shape of the vascular network structure may be, for example, a length of the vascular network structure. The shape detection unit 50 detects the length of the skeleton present in the skeleton image as a length of the vascular network structure. The length of the skeleton may be, for example, the number of pixels of the object pixels constituting the skeleton. When the skeleton is branched into multiple branches, the number of pixels of each of the branched skeletons may be calculated, and the sum of the numbers of pixels of the respective branched skeletons may be detected as a length (total length) of the skeleton.

The shape detection unit 50 generates an extracted image which is an image obtained by extracting the skeletons having a length larger than a threshold from the skeletons present in the skeleton image. The threshold is determined in advance based on the properties of the sample, observation conditions in measurement, and the like. The shape detection unit 50 obtains an extracted image by removing skeletons smaller than or equal to the threshold from the skeleton image. Accordingly, small skeletons that are not likely to be regarded as constituting the vascular network structure in the skeleton image are filtered out as noise, and skeletons larger than the threshold are extracted. Thus, the shape detection unit 50 can generate an extracted image in which the skeletons of the vascular network structure are appropriately extracted from the skeleton image. The shape detection unit 50 outputs the extracted image or the lengths of all the skeletons in the extracted image to the display control unit 60. The shape detection unit 50 causes the second storage device 140 to store the extracted image or the lengths of all the skeletons in the extracted image.

The shape detection unit 50 may detect the number of branch points of the vascular network structure as the shape of the vascular network structure. For example, the shape detection unit 50 may detect, as the number of branch points, the number obtained by subtracting 2 from the number of object pixels adjacent to at least three of the above, below, left and right among the object pixels constituting the skeleton present in the skeleton image. The shape detection unit 50 may generate an extracted image which is an image obtained by extracting the skeletons having the number of branch points larger than a threshold from the skeletons present in the skeleton image. The threshold is determined in advance based on the properties of the sample, observation conditions in measurement, and the like. Accordingly, skeletons with a small number of branch points that are not likely to be regarded as constituting the vascular network structure in the skeleton image are filtered out as noise, and skeletons larger than the threshold are extracted to thereby generate an extracted image in which the skeletons of the vascular network structure are appropriately extracted from the skeleton image. The shape detection unit 50 may output the extracted image or the number of branch points of all the skeletons in the extracted image to the display control unit 60. The shape detection unit 50 may cause the second storage device 140 to store the extracted image or the number of branch points of all the skeletons in the extracted image. The shape detection unit 50 may output the number of branch points of the skeletons in a specific region in the extracted image or the number of branch points of the skeletons per unit area in the extracted image to the display control unit 60 or may cause the second storage device 140 to store them.

The display control unit 60 is connected to the acquisition unit 10, the background processing unit 20, the contour extraction unit 30, the skeleton extraction unit 40 or the shape detection unit 50 in the image processing device 1 and the display device 130 outside the image processing device 1. The display control unit 60 controls display on the display device 130. The display control unit 60 controls the display device 130 to display a cutout image, a gradation image, a removed image, an adjusted image, a contour image, a skeleton image or an extracted image. The display control unit 60 may cause the display device 130 to display a list of the lengths or a list of the number of branch points of all the skeletons in the extracted image.

The display device 130 is a device connected to the display control unit 60 of the image processing device 1 and displays the content controlled by the display control unit 60. The display device 130 displays a cutout image, a gradation image, a removed image, an adjusted image, a contour image, a skeleton image or an extracted image. The display device 130 may display a list of the lengths or a list of the number of branch points of all the skeletons in the extracted image. The display device 130 may be, for example, a display.

The second storage device 140 may be, for example, a storage medium such as a hard disk. The second storage device 140 stores data used in the image processing device 1, such as a cutout image, a gradation image, a removed image, an adjusted image, a contour image, a skeleton image, an extracted image, a list of the lengths or a list of the number of branch points of all the skeletons in the extracted image, and the like. The first storage device 120 and the second storage device 140 may be the same storage device.

Image Processing Method

Figure 3:
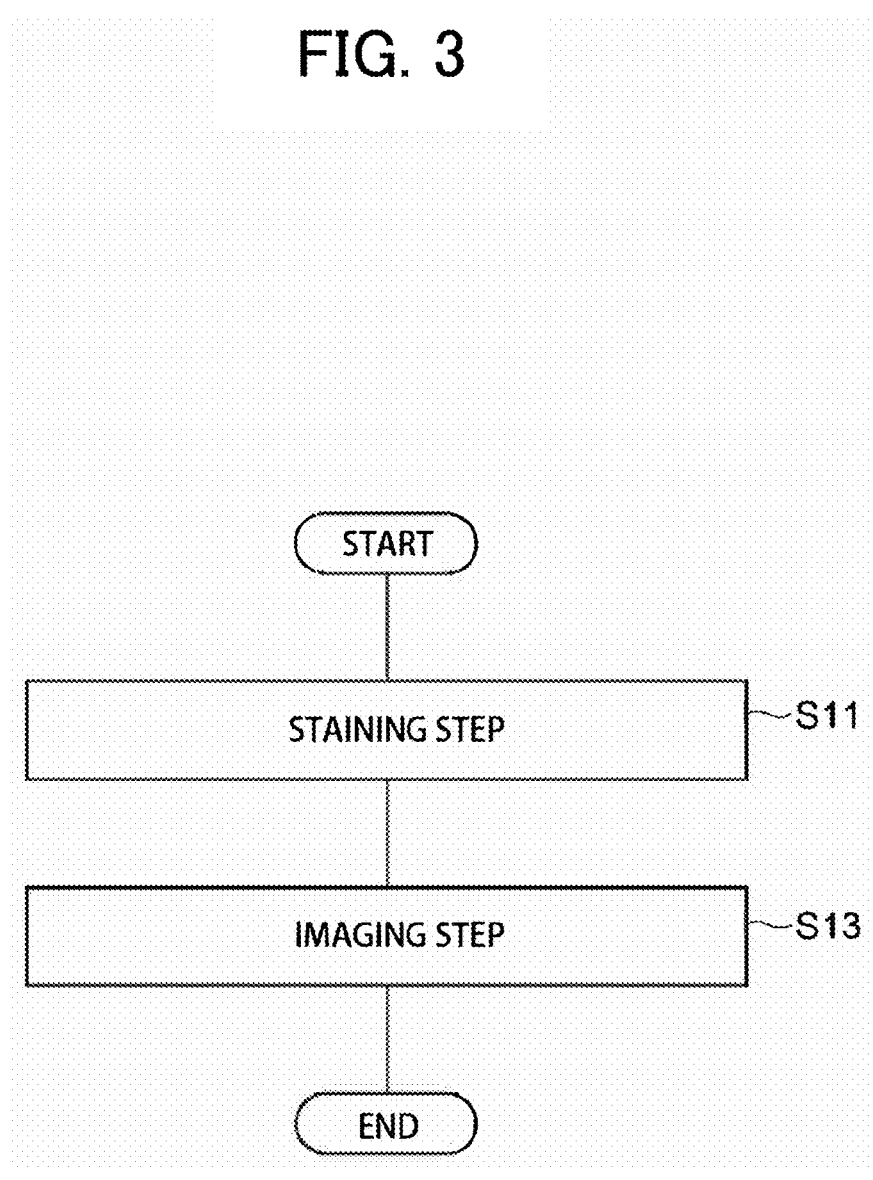
FIG. 3 is a flowchart illustrating an example procedure for acquiring an image by an image processing method according to an embodiment of the present invention.

Next, the operation of the image processing system 2 will be described. First, the procedure for acquiring a captured image to be processed by the image processing device 1 will be described. FIG. 3 is a flowchart illustrating an example procedure for acquiring an image by an image processing method according to an embodiment. The method shown in FIG. 3 can be started, for example, when cell lines, reagents and consumables according to the preparation of the 3D hepatic model are prepared.

First, in a staining step (S11), the vascular network structure of the 3D hepatic model is stained by an operator or the like. In this step, the preparation process, the administration process and the stain control process described above are performed.

Then, in an imaging step (S13), the imaging device 110 of the image processing system 2 images the 3D hepatic model having the vascular network structure stained by the staining step (S11). The imaging device 110 images a region including the center of the 3D hepatic model. The imaging device 110 acquires a captured image of the 3D hepatic model by summing the intensities of the pixel values, color tones, and the like of multiple images with different Z axis positions of the confocal microscope for each 3D hepatic model imaged. The imaging device 110 outputs the captured image to the acquisition unit 10 and the second storage device 140.

Figure 4:
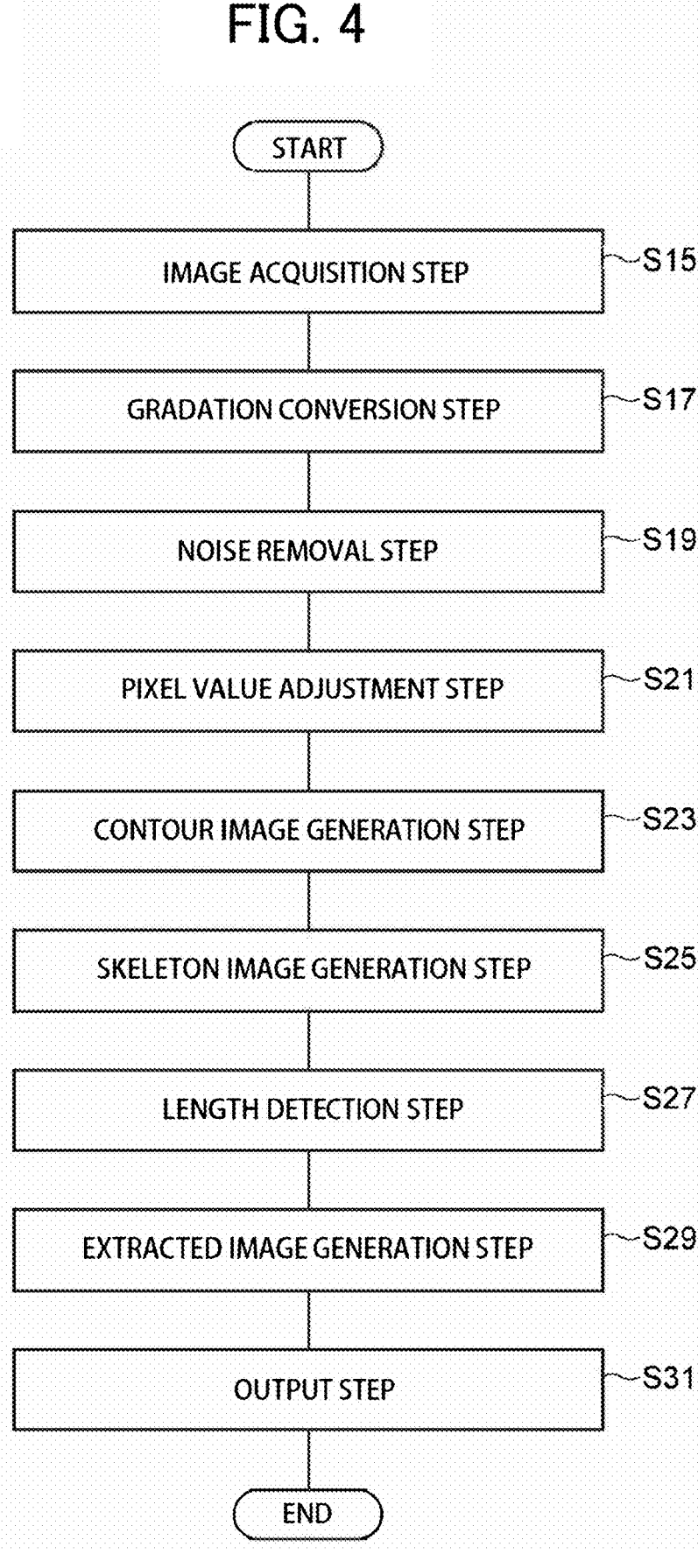
FIG. 4 is a flowchart illustrating an example image processing method according to an embodiment of the present invention.

Thus, the flowchart shown in FIG. 3 is completed. By performing the flowchart shown in FIG. 3, a captured image to be processed by the image processing method according to an embodiment is acquired. Next, referring to FIG. 4, the operation of the image processing device 1 of the image processing system 2 will be described. FIG. 4 is a flowchart illustrating an example image processing method according to an embodiment. The flowchart shown in FIG. 4 can be started, for example, in response to a start operation by the operator after the completion of the flowchart shown in FIG. 3.

First, in an image acquisition step (S15), the acquisition unit 10 of the image processing device 1 acquires a captured image of a 3D hepatic model having a stained vascular network structure from the imaging device 110 or the first storage device 120.

Then, in a gradation conversion step (S17), the background processing unit 20 of the image processing device 1 generates a cutout image by extracting a region including the center of the 3D hepatic model from the captured image and converts the generated image to a gradation image. The background processing unit 20 may generate, for example, multiple cutout images from the captured image, and convert them into gradation images.

Then, in a noise removal step (S19), the background processing unit 20 generates a removed image by removing a background signal from the gradation image generated in the gradation conversion step (S17). The background processing unit 20 may remove a background signal by, for example, a sliding paraboloid method.

Then, in a pixel value adjustment step (S21), the background processing unit 20 generates an adjusted image by reducing a noise of the removed image generated in the noise removal step (S19). The background processing unit 20 increases the difference between pixel values of the pixels in the removed image while maintaining the distribution of the pixel values of the pixels and subtracts a predetermined pixel value to thereby generate an adjusted image.

Then, in a contour image generation step (S23), the contour extraction unit 30 of the image processing device 1 applies the wavelet transform to the adjusted image generated in the pixel value adjustment step (S21) to thereby generate a contour image in which contours of the vascular network structure are extracted. The contour extraction unit 30 repeats decomposition by the wavelet transform, extracts high frequency components, and combines them into a single image. The contour extraction unit 30 sets the intensities of pixels having a pixel value less than a threshold to 0 and the intensities of pixels having a pixel value higher than or equal to the threshold to 1 to thereby generate a binarized contour image.

Then, in a skeleton image generation step (S25), the skeleton extraction unit 40 of the image processing device 1 repeatedly excludes pixels from object boundaries present in the contour image to thereby generate a skeleton image in which skeletons having a line width of a predetermined number of pixels are extracted. The skeleton extraction unit 40 repeatedly excludes object pixels from the boundary of the object region in the binarized contour image until the width of the object region becomes the predetermined number of pixels.

Then, in a length detection step (S27), the shape detection unit 50 of the image processing device 1 detects the length of the vascular network structure based on the skeletons present in the skeleton image. The shape detection unit 50 may calculate, for example, the number of pixels of each skeleton in the skeleton image.

Then, in an extracted image generation step (S29), the shape detection unit 50 generates an extracted image which is an image obtained by extracting the skeletons having a length larger than a threshold from the skeletons present in the skeleton image.

Then, in an output step (S31), the display control unit 60 of the image processing device 1 causes the display device 130 of the image processing system 2 to display the extracted image or a list of the lengths of all the skeletons in the extracted image. The shape detection unit 50 causes the second storage device 140 of the image processing system 2 to store the extracted image or a list of the lengths of all the skeletons in the extracted image.

Thus, the flowchart shown in FIG. 4 is completed. By performing the steps described by the flowchart shown in FIG. 4, information on the length of the vascular network structure is automatically output from the captured image.

Image Processing Program

An image processing program for causing a computer to function as the image processing device 1 will be described. The image processing program includes a main module, an acquisition module, a contour generation module and a skeleton generation module. The image processing program may include a background processing module and a shape detection module. The main module is a portion that performs overall control of the device. The functions implemented by executing the acquisition module, the contour generation module, the skeleton generation module, the background processing module and the shape detection module are the same as the respective functions of the acquisition unit 10, the background processing unit 20, the contour extraction unit 30, the skeleton extraction unit 40, the shape detection unit 50 and the display control unit 60 of the image processing device 1 described above. The image processing program may be provided by, for example, a recording medium such as a ROM or a semiconductor memory.

According to the image processing method and the image processing program of the present embodiment, an image in which a cell structure having a vascular network structure is imaged is processed. First, the wavelet transform is applied to the image. Accordingly, a contour image is generated in which the contours of the vascular network structure are extracted (contour image generation step (S23)). Subsequently, object pixels are repeatedly excluded from the recognized object boundaries in the contour image. Accordingly, a skeleton image is generated in which skeletons of the vascular network structure are extracted (skeleton image generation step (S25)). Since the skeleton image is generated from the contour image, it is possible to obtain skeletons that reflect the shape of blood vessels more accurately compared with a case where the skeleton image is directly generated from the captured image. Therefore, the image processing method and the image processing program can generate an image that enables more accurate recognition of the shape of the vascular network structure.

Further, since the image processing method according to the present embodiment includes the step of detecting the shape of the vascular network structure based on the skeleton image (length detection step (S27) or extracted image generation step (S29)), it is possible to evaluate the characteristics of the vascular network structure using the detected shape of the vascular network structure.

Further, since the image processing method according to the present embodiment includes the step of detecting the shape of the vascular network structure (length detection step (S27) or extracted image generation step (S29)), it is possible to evaluate the characteristics of the vascular network structure using the detected length of the vascular network structure.

Further, since the image processing method according to the present embodiment targets the captured image in which the region including the center of the 3D hepatic model is imaged, it is possible to appropriately extract a region in which the vascular network structure of the 3D hepatic model is highly likely to be imaged.

Further, since the image processing method according to the present embodiment includes the step of generating an image in which a background signal of the vascular network structure is removed from the image (noise removal step (S19)), the step being performed after the step of acquiring the image (image acquisition step (S15)) and before the step of generating the contour image (contour image generation step (S23)), it is possible to further clearly extract the skeletons indicating the vascular network structure with the background signal of the image being removed.

Further, since the image processing method according to the present embodiment includes the step of generating an extracted image in which the skeletons having a length larger than a threshold are extracted from the skeletons present in the skeleton image (length detection step (S27) and extracted image generation step (S29)), the step being performed after the step of generating the skeleton image (skeleton image generation step (S25)), it is possible to remove the skeletons which are not likely to constitute the vascular network structure, as noise.

Further, since the image processing method according to the present embodiment includes the step of generating an image by converting the image into a gradation image with a predetermined gradation (gradation conversion step (S17)) the step being performed after the step of acquiring the image (image acquisition step (S15)) and before the step of generating the contour image (contour image generation step (S23)), it is possible to convert the captured image into a gradation image and the converted image can be smoothly processed.

Further, since the image processing method according to the present embodiment further includes the step of staining the vascular network structure by subjecting cells having the vascular network structure to immunostaining, by subjecting cells having the vascular network structure to fluorescent modification in advance, or by a combination of immunos-taining and fluorescent modification (staining step (S11)), the step being performed before the step of acquiring the image (image acquisition step (S15)); and the step of imaging the 3D hepatic model having the vascular network structure stained by the staining step (imaging step (S13)), it is possible to perform the staining step (S11) and the imaging step (S13) on the 3D hepatic model having the vascular network structure so that the shape of the vascular network structure can be accurately recognized for each 3D hepatic model.

Further, since the image processing method according to the present embodiment targets the 3D hepatic model having the vascular endothelial cells, the vascular network structure in the vascular endothelial cells can be extracted so that the shape of the vascular network structure can be detected.

An embodiment of the present disclosure has been described, but the present disclosure should not be limited to the above embodiment. For example, the image processing device 1 may include the imaging device 110, the first storage device 120, the display device 130 or the second storage device 140 of the image processing system 2. The image processing device 1 may not necessarily include the background processing unit 20, the shape detection unit 50 and the display control unit 60.

EXAMPLES

Referring to FIGS. 5 to 10, effects of the image processing method and the image processing program will be described. In FIGS. 5 to 8, a control sample in which cyclophosph-amide was not administered to the 3D hepatic model was obtained as a captured image. In the following description, the captured images are subjected to the steps in the flow-charts shown in FIGS. 3 and 4 unless otherwise specified. Effect of Contour Image Generation Step Between the cases where the contour image generation step (S23) was performed and where the contour image generation step (S23) was not performed (or other steps were performed) in the flowchart shown in FIG. 4, the resulting skeletons were compared. FIGS. 5A to 5F show example images obtained by the contour image generation step and the skeleton image generation step. Hereinafter, an image immediately before the skeleton image generation step (S25) is referred to as an original image.

Comparative Example 1

Figure 5A:
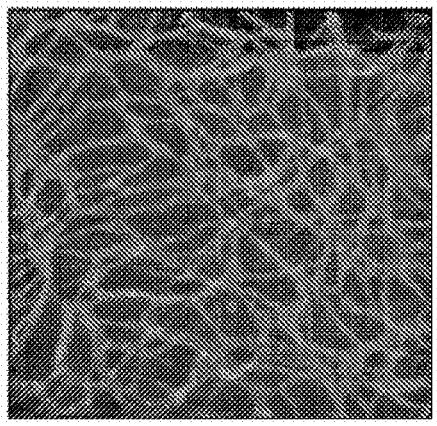
FIGS. 5A-5F are diagrams showing example images obtained by a contour image generation step and a skeleton image generation step according to an example.
Figure 5B:
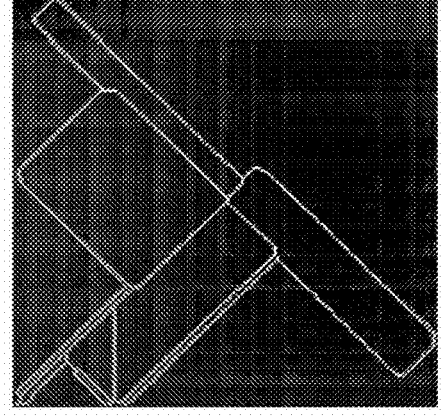

FIG. 5A is an image on which the contour image genera-tion step (S23) has not been performed. FIG. 5B is an image obtained by performing the skeleton image generation step (S25) using the image shown in FIG. 5A as an original image (Comparative Example 1). As shown in FIG. 5B, a linear shape that does not represent the vascular network structure in the original image was displayed, and the skeletons of the vascular network structure were, appropriately, not extracted as a skeleton image.

Comparative Example 2

Figure 5C:
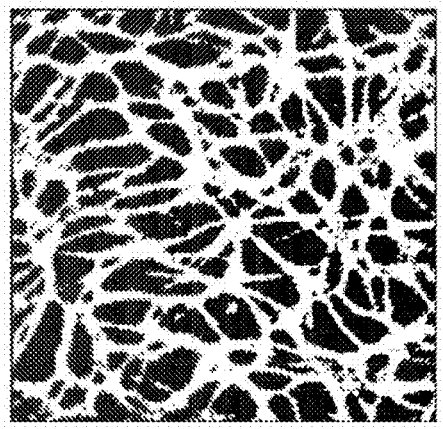
Figure 5D:
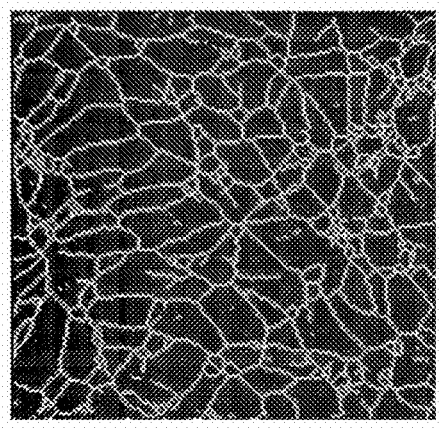

FIG. 5C is an image obtained by performing binarization, instead of the contour image generation step (S23), on the image shown in FIG. 5A by setting a threshold of the pixel values so that pixels greater than or equal to the threshold are displayed in white and the pixels smaller than the threshold are displayed in black. FIG. 5D is an image obtained by performing the skeleton image generation step (S25) using the image shown in FIG. 5C as an original image (Com-parative Example 2). As shown in FIG. 5D, skeletons that matched the original image to some extent were extracted. However, skeletons were not accurately extracted, for example, in regions indicating small cavities in the vascular network structure of the original image, and the formed skeleton pattern was more complicated than the correspond-ing portion of the original image. The reason for this seems to be that cavities were present on the pattern generated by the binarization. The skeleton image generation step is a step in which the object recognized in the image is eroded from the edge of the object until the width becomes 1 pixel. However, the original image shown in FIG. 5C had small black dots (holes) that were present everywhere in the entire pattern extracted in white. In the skeleton image generation step, these holes seemed to be recognized as a part of the edge, hindering accurate extraction of the skeletons.

Example 1

Figure 5E:
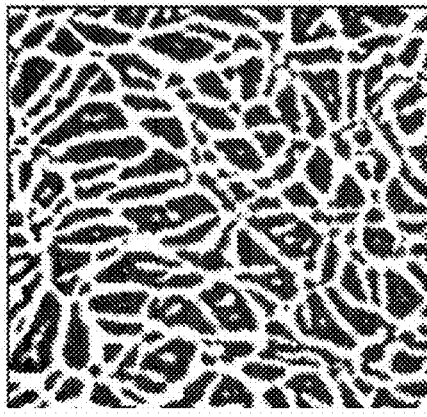
Figure 5F:
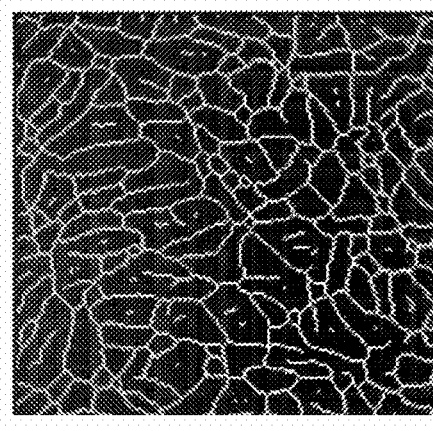

FIG. 5E is an image obtained by performing the contour image generation step (S23) on the image shown in FIG. 5A. FIG. 5F is an image obtained by performing the skeleton image generation step (S25) using the image shown in FIG. 5E as an original image (Example 1). Although information such as a thickness of the blood vessels was lost from the image shown in FIG. 5A as shown in FIG. 5E, skeletons that matched the original image were extracted as shown in FIG. 5F, compared with Comparative Example 1 and Compara-tive Example 2, and in particular, skeletons that accurately represented the small cavities in the vascular network struc-ture of the original image were extracted. Therefore, it was found that extraction of skeletons in the skeleton image generation step does not necessarily require accurate capture of the blood vessel regions of the original image, but only requires extraction of approximate contours.

As described above, Example 1, Comparative Example 1 and Comparative Example 2 showed that the skeletons of the vascular network structure in the image were more appropriately extracted in the skeleton image generation step (S25) by performing the contour image generation step (S23). The small black dots that were problematic in Comparative Example 2 were difficult to distinguish in terms of definition from the mesh portions in the original image, and thus it was difficult to mechanically fill the small black dots by an algorithm. Further, although it is also conceivable to set a threshold in the binarization so that small black dots are not formed in Comparative Example 2, this results in increased noise, and is not realistic. As seen from Example 1 and Comparative Example 2, the above problems caused by the small black dots could be solved by a new approach of extracting a skeleton after extracting approximate contours of the original image.

Effect of Pixel Value Adjustment Step

Between the cases where the pixel value adjustment step (S21) was performed and where the pixel value adjustment step (S21) was not performed, the resulting skeletons were compared. FIGS. 6A to 6D are diagrams showing example images obtained by a gradation conversion step, a noise removal step, a contour image generation step and a skeleton image generation step. FIGS. 7A to 7D are diagrams showing example images obtained by a pixel value adjustment step, a contour image generation step and a skeleton image generation step.

Comparative Example 3

Figure 6A:
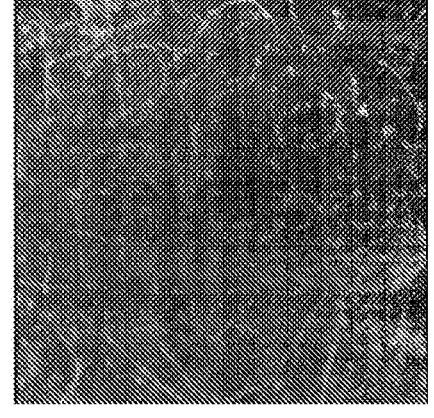
FIGS. 6A-6D are diagrams showing example images obtained by a gradation conversion step, a noise removal step, a contour image generation step and a skeleton image generation step.
Figure 6B:
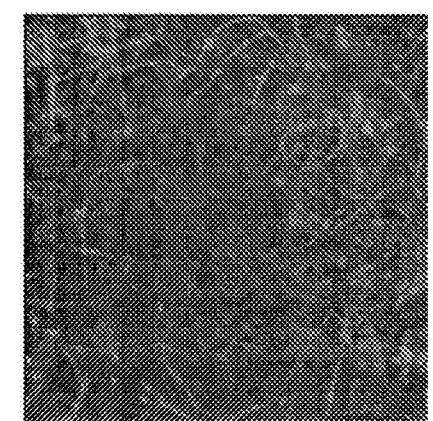
Figure 6C:
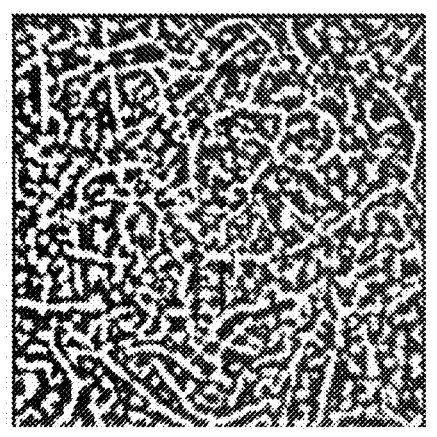
Figure 6D:
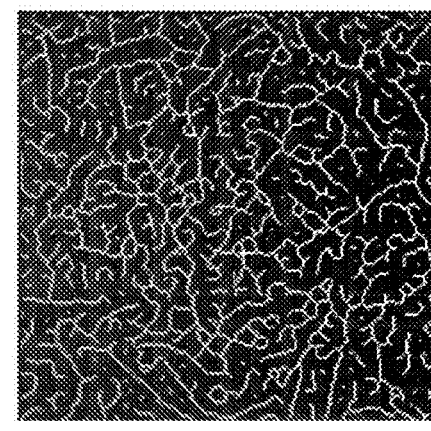

FIG. 6A is a gradation image generated by the gradation conversion step (S17). FIG. 6B is a removed image obtained by performing the noise removal step (S19) on the gradation image shown in FIG. 6A. FIG. 6C is an image obtained by performing the contour image generation step (S23) without performing the pixel value adjustment step (S21) on the image shown in FIG. 6B. FIG. 6D is an image obtained by performing the skeleton image generation step (S25) on the image shown in FIG. 6C (Comparative Example 3). As shown in FIG. 6D, in which the pixel value adjustment step (S21) has not been performed, the vascular network structure was displayed as being connected to other vascular networks in a region where a vascular network structure was not clearly visible in the gradation image, resulting in inappropriate extraction of the contours and skeletons of the vascular network structure as the contour image. The reason for this seems to be that the actual vascular region and noise were extracted as contours without being distinguished from each other in the contour image generation step (S23).

Example 2

Figures 7A, 7B, 7C, 7D:
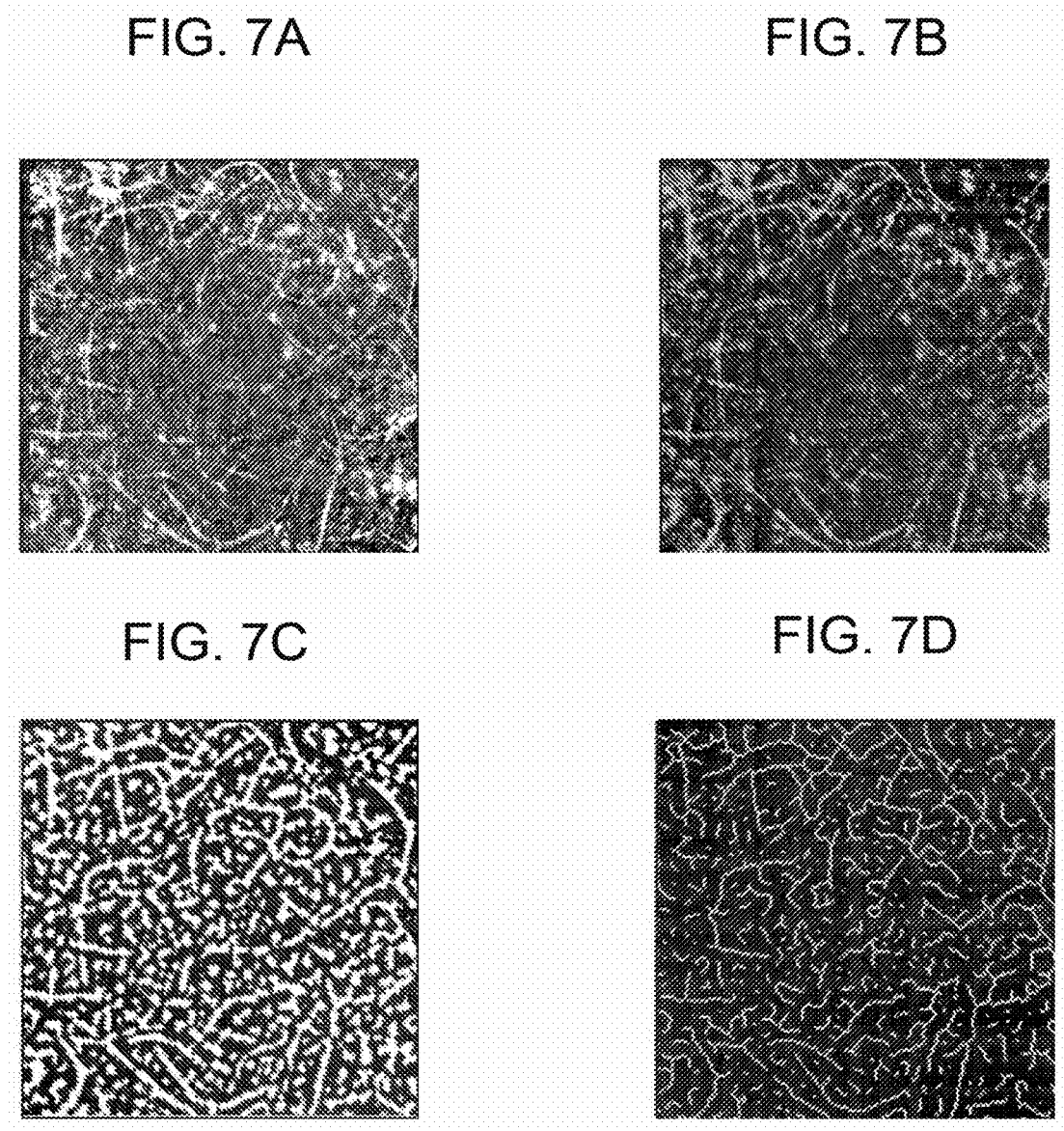
FIGS. 7A-7D are diagrams diagram showing example images obtained by a pixel value adjustment step, a contour image generation step and a skeleton image generation step.

FIG. 7A is an image obtained by adjusting the distribution of pixel values in the same removed image as the removed image shown in FIG. 6B. FIG. 7B is an image obtained by subtracting a predetermined pixel value from the pixel value of each pixel of the image shown in FIG. 7A. That is, FIG. 7A is an intermediate image in the pixel value adjustment step (S21), and FIG. 7B is an adjusted image obtained when the pixel value adjustment step (S21) is completed. FIG. 7C is a contour image obtained by performing the contour image generation step (S23) on the image shown in FIG. 7B. FIG. 7D is an image obtained by performing the skeleton image generation step (S25) on the contour image shown in FIG. 7C (Example 2). As seen from FIGS. 7A and 7B, noise was removed by performing the pixel value adjustment step (S21). As seen FIG. 7D, compared with Comparative Example 3 shown in FIG. 6D, the vascular network structure was prevented from being displayed as being connected to other vascular networks in a region where a vascular network structure was not clearly visible in the gradation image, resulting in appropriate extraction of the contours and skeletons of the vascular network structure as the contour image. Therefore, it was found that, by performing the pixel value adjustment step (S21), the contours of the vascular network structure in the image were more appropriately extracted in the contour image generation step (S23) and the skeletons of the vascular network structure in the image were more appropriately extracted in the skeleton image generation step (S25).

Figures 8A, 8B, 8C:
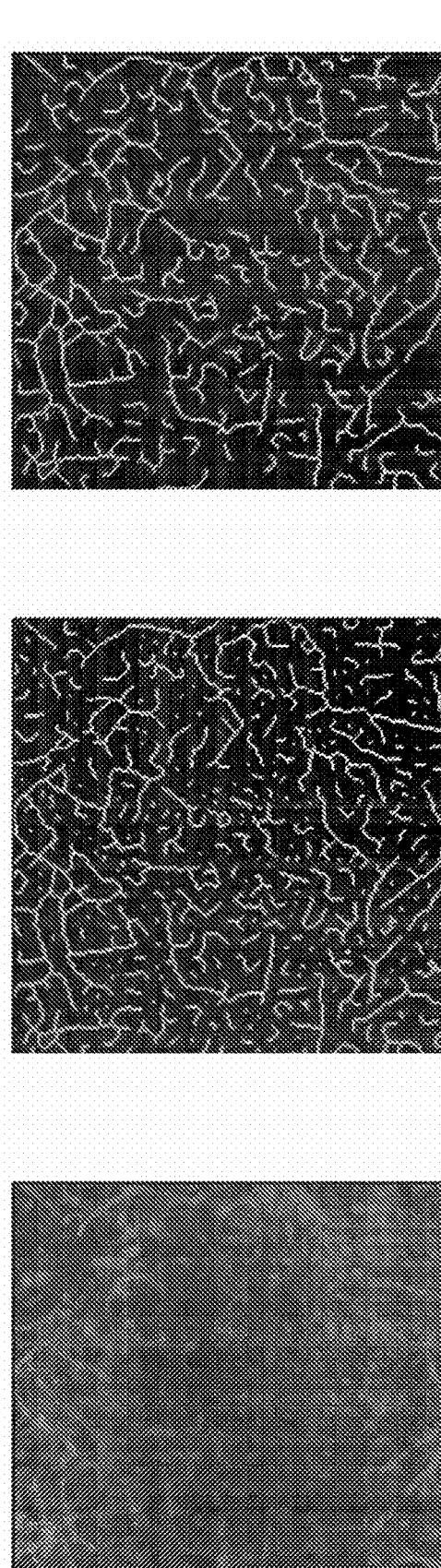
FIGS. 8A-8C are diagrams showing example images obtained by an extracted image generation step.

Effect of Extracted Image Generation Step Next, between the cases where the extracted image generation step (S29) was performed and where the extracted image generation step (S29) was not performed, the resulting skeletons were compared. FIG. 8A is a captured image. FIG. 8B is a skeleton image before the extracted image generation step (S29) was performed (Comparative Example 4). FIG. 8C is an extracted image after the extracted image generation step (S29) was performed (Example 3).

Comparison between FIGS. 8B and 8C showed that, when the extracted image generation step (S29) was performed, the skeletons with a small skeleton length were removed, whereby the extracted image displayed a structure closer to the vascular network structure recognized in the captured image compared with the skeleton image, resulting in appropriate extraction of the skeletons of the vascular network structure. Therefore, it was found that, by performing the extracted image generation step (S29), the skeletons of the vascular network structure in the image were more appropriately extracted.

Quantitative Evaluation of Vascular Network

The following description will be given of a quantitative evaluation of vascular networks of sample groups obtained by exposing a 3D hepatic model (cell structure) prepared in the preparation process described in the embodiment to cyclophosphamide at various concentrations. FIGS. 9A to 9F are captured images acquired by the flowchart shown in FIG. 3, and the dosage concentration of cyclophosphamide were 0 M, 143 M, 430 M, 1430 μM, 4300 μM and 14300 M, respectively. FIGS. 9G to 9L are extracted images obtained by performing the steps in the flowchart shown in FIG. 4 on the captured images shown in FIGS. 9A to 9F, respectively.

As can be seen in the captured images shown in FIGS. 9A to 9F, there is a tendency that the higher the dosage concentration of cyclophosphamide, the smaller the length of the vascular network structure. The extracted images shown in FIGS. 9G to 9L also reflect the tendency that the higher the dosage concentration of cyclophosphamide, the smaller the skeleton length.

Figure 10A:
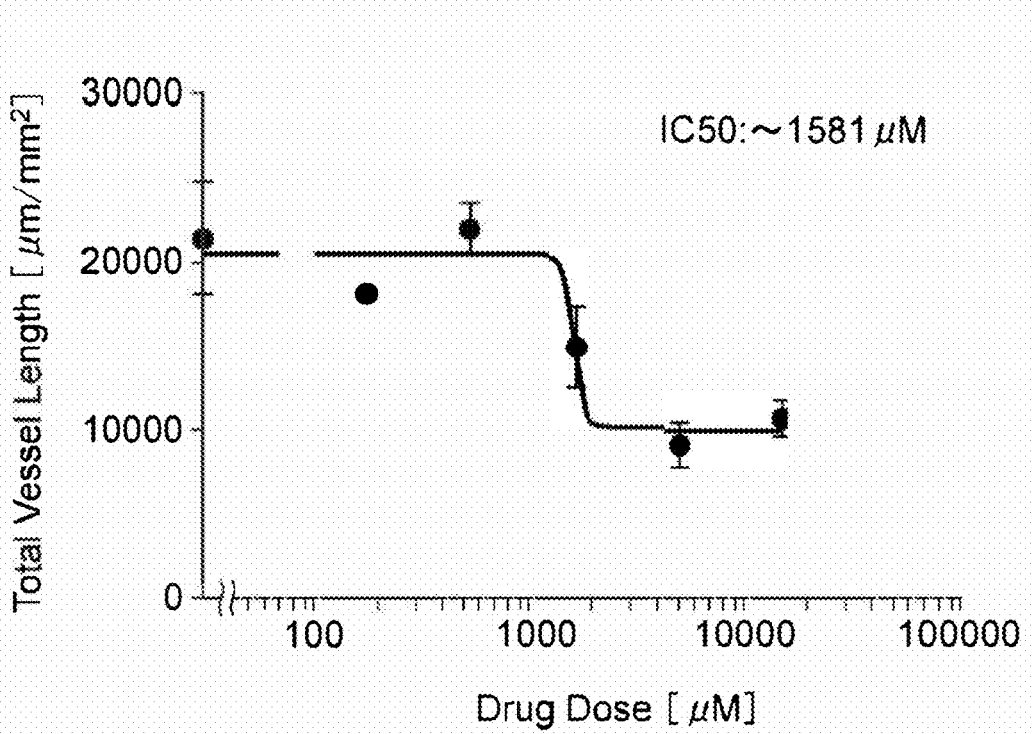
FIGS. 10A and 10B are diagrams in which 10A shows the correspondence relationship between the skeleton length in the extracted images according to the example and the dosage concentration of cyclophosphamide, and 10B shows the correspondence relationship between the number of branch points of skeletons in the extracted images and the dosage concentration of cyclophosphamide.
Figure 10B:
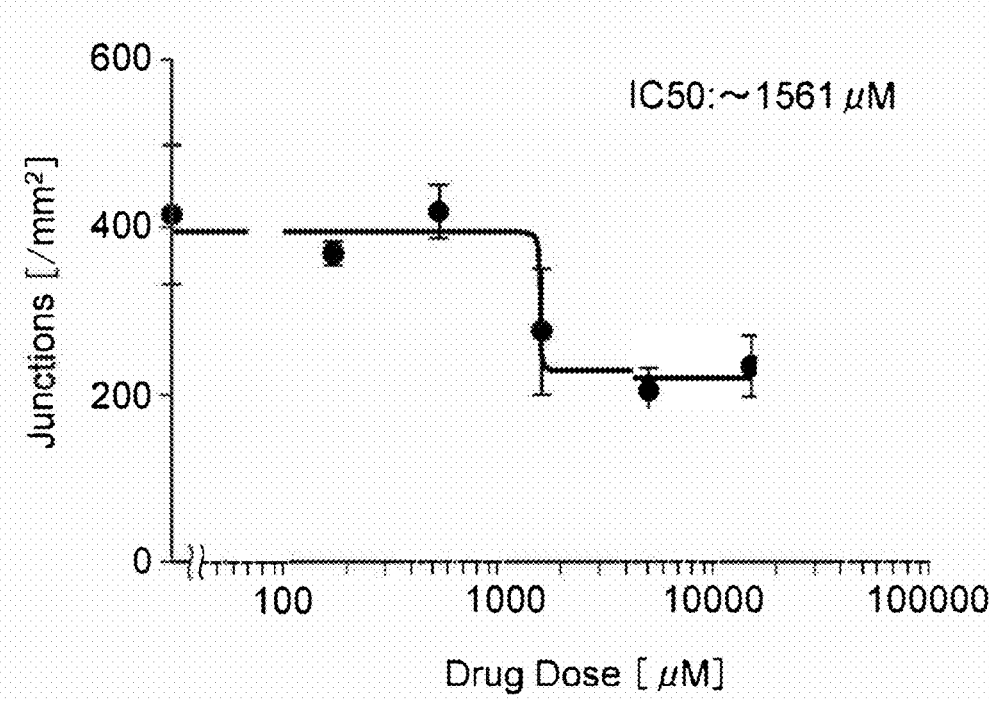

FIGS. 10A and 10B show the results of extracting the skeleton length and the number of branch points in the extracted images shown in FIGS. 9G to 9L. FIG. 10A is a diagram showing the correspondence relationship between the skeleton length in the extracted images according to the example and the dosage concentration of cyclophosphamide, and FIG. 10B is a diagram showing the correspondence relationship between the number of branch points of skeletons in the extracted images and the dosage concentration of cyclophosphamide. As can be seen in FIGS. 10A and 10B, the shape of the vascular network structure significantly changes and the vascular network structure decreases when the dosage concentration of cyclophosphamide exceeds a certain level. Therefore, the characteristics and tendency of the shape of the vascular network structure were found to be recognized appropriately by the extracted images produced by the image processing method.

Part or all of the present disclosure can also be described as follows.

A computer-readable storage medium storing an image processing program for causing one or more computers to implement a function for obtaining a shape of a vascular network structure, the image processing program causing the one or more computers to function as: an acquisition unit that acquires an image in which a cell structure having a stained vascular network structure is imaged; a contour extraction unit that generates a contour image in which contours of the vascular network structure are extracted by applying a wavelet transform to the image; and a skeleton extraction unit that generates a skeleton image in which skeletons having a line width of a predetermined number of pixels are extracted by repeatedly excluding object pixels from object boundaries present in the contour image.

An image processing device including: an acquisition unit that acquires an image in which a cell structure having a stained vascular network structure is imaged; a contour extraction unit that generates a contour image in which contours of the vascular network structure are extracted by applying a wavelet transform to the image; and a skeleton extraction unit that generates a skeleton image in which skeletons having a line width of a predetermined number of pixels are extracted by repeatedly excluding object pixels from object boundaries present in the contour image.

The recording medium and the image processing device have the same effects as the image processing method and the image processing program described above.

WO2017/146124 describes an artificial cell structure having a vascular network structure. The cells constituting the vascular network structure of the cell structure are immunostained using anti-CD31 antibodies. Accordingly, the vascular network structure can be observed with a microscope.

Although the vascular network structure of the cell structure described in WO2017/146124 can be observed with a microscope, the vascular network structure is dense and thus difficult to quantitatively analyze. As an example technique for quantitatively analyzing the vascular network structure, cell counting of the cell structure can be performed by subjecting the prepared cell structure to trypsin treatment or the like. With this technique, however, it is difficult to count only the cells constituting the vascular network structure. Alternatively, in an image in which an immunostained cell structure is imaged, the vascular network structure can be determined and evaluated based on the intensity of the fluorescence caused by the cells constituting the vascular network structure. However, since the stained cells are not necessarily the cells constituting the vascular network structure, it is insufficient to evaluate the shape, such as a length, of the vascular network structure. The present disclosure provides a method and a program for generating an image that enables more accurate recognition of the shape of a vascular network structure.

An image processing method according to an aspect of the present invention includes: acquiring an image in which a cell structure having a stained vascular network structure is imaged; generating a contour image in which contours of the vascular network structure are extracted by applying a wavelet transform to the image; and generating a skeleton image in which skeletons having a line width of a predetermined number of pixels are extracted by repeatedly excluding object pixels from object boundaries recognized in the contour image.

According to the image processing method, an image in which a cell structure having a vascular network structure is imaged is processed. First, the wavelet transform is applied to the image. Accordingly, a contour image is generated in which contours of the vascular network structure are extracted. Subsequently, object pixels are repeatedly excluded from the recognized object boundaries in the contour image. Accordingly, a skeleton image is generated in which skeletons of the vascular network structure are extracted. Since the skeleton image is generated from the contour image, it is possible to obtain skeletons that reflect the shape of blood vessels more accurately compared with a case where the skeleton image is directly generated from the image. Therefore, the image processing method can generate an image that enables more accurate recognition of the shape of the vascular network structure.

In one embodiment, the image processing method may further include a step of detecting a shape of the vascular network structure based on the skeleton image. In this case, the image processing method can evaluate the characteristics of the vascular network structure using the detected shape of the vascular network structure.

In one embodiment, the shape of the vascular network structure may be a length of the vascular network structure. In this case, the image processing method can evaluate the characteristics of the vascular network structure using the detected length of the vascular network structure.

In one embodiment, the captured image may be an image of a region including a center of the cell structure. In this case, the image processing method can appropriately extract a region in which the vascular network structure of the cell structure is highly likely to be imaged.

In one embodiment, the image processing method may further include a step of generating an image from which a background signal of the image is removed, the step being performed after the step of acquiring the image and before the step of generating the contour image. In this case, since the background signal of the image is removed, the image processing method can more clearly extract skeletons indicating the vascular network structure.

In one embodiment, the image processing method may further include a step of generating an extracted image in which the skeletons having a length larger than a threshold are extracted from the skeletons present in the skeleton image, the step being performed after the step of generating the skeleton image. In this case, since vascular structures having skeleton lengths smaller than or equal to the threshold are not extracted, the image processing method can remove skeletons which are not likely to constitute the vascular network structure, as noise.

In one embodiment, the image processing method may further include a step of converting the image into an image having a predetermined gradation, the step being performed after the step of acquiring the image and before the step of generating the contour image. In this case, since the captured image is converted into an image having a predetermined gradation, the image processing method can smoothly proceed with the processing on the converted image.

In one embodiment, the image processing method may further include: staining the vascular network structure by subjecting cells having the vascular network structure to immunostaining, by subjecting cells having the vascular network structure to fluorescent modification in advance, or by a combination of immunostaining and fluorescent modification, the step being performed before the step of acquiring the image; and imaging a cell structure having the vascular network structure stained by the staining step, wherein the step of acquiring the image may acquire an image imaged by the imaging step. In this case, by performing the staining step and the imaging step on the cell structure having the vascular network structure, the image processing method can more accurately recognize the shape of the vascular network structure for each cell structure.

In one embodiment, the cell structure may include vascular endothelial cells.

An image processing program according to another aspect of the present disclosure causes a computer to execute processes of: acquiring an image in which a cell structure having a stained vascular network structure is imaged; generating a contour image in which contours of the vascular network structure are extracted by applying a wavelet transform to the image; and generating a skeleton image in which skeletons having a line width of a predetermined number of pixels are extracted by repeatedly excluding object pixels from object boundaries present in the contour image.

The image processing program has the same effects as the image processing method described above.

According to an aspect and an embodiment of the present disclosure, the shape of a vascular network structure can be more accurately recognized.

Obviously, numerous modifications and variations of the present invention are possible in light of the above teachings. It is therefore to be understood that within the scope of the appended claims, the invention may be practiced otherwise than as specifically described herein.

The invention claimed is:

1. An image processing method, comprising:
acquiring an image in which a cell structure having a stained vascular network structure is imaged;
converting the image to an image with a predetermined gradation;
generating a removed image by removing background signals from the image with the predetermined gradation;
generating an adjusted image by reducing noise of the removed image;
applying a wavelet transform to the adjusted image such that a contour image in which contours of the vascular network structure are extracted is generated;
repeatedly excluding object pixels from object boundaries recognized in the contour image such that a skeleton image in which skeletons having a line width of a predetermined number of pixels are extracted is generated; and
generating an extracted image in which skeletons drawn in the skeleton image whose length is greater than a threshold are extracted.

2. The image processing method according to claim 1, further comprising:
detecting a shape of the vascular network structure based on the skeleton image.

3. The image processing method according to claim 2, wherein the shape of the vascular network structure is a length of the vascular network structure.

4. The image processing method according to claim 2, wherein the image is an image of a region including a center of the cell structure.

5. The image processing method according to claim 2, further comprising:
subjecting cells having the vascular network structure to immunostaining such that the vascular network structure is stained before the image is acquired; and imaging a cell structure having the vascular network structure stained,
wherein the acquiring of the image includes acquiring an image imaged by the imaging of cell structure having the vascular network structure stained.

6. The image processing method according to claim 2, further comprising:
subjecting cells having the vascular network structure to fluorescent modification in advance such that the vascular network structure is stained before the image is acquired; and
imaging a cell structure having the vascular network structure stained,
wherein the acquiring of the image includes acquiring an image imaged by the imaging of cell structure having the vascular network structure stained.

7. The image processing method according to claim 2, further comprising:
conducting immunostaining and fluorescent modification such that the vascular network structure is stained before the image is acquired; and
imaging a cell structure having the vascular network structure stained,
wherein the acquiring of the image includes acquiring an image imaged by the imaging of cell structure having the vascular network structure stained.

8. The image processing method according to claim 2, wherein the cell structure includes vascular endothelial cells.

9. The image processing method according to claim 2, wherein
the predetermined number of pixels defining the line width of the skeletons extracted in the skeleton image is 1 pixel, and
the shape of the vascular network structure detected is a number of branch points of the vascular network structure.

10. The image processing method according to claim 1, wherein the image is an image of a region including a center of the cell structure.

11. The image processing method according to claim 1, further comprising:
subjecting cells having the vascular network structure to immunostaining such that the vascular network structure is stained before the image is acquired; and
imaging a cell structure having the vascular network structure stained,
wherein the acquiring of the image includes acquiring an image imaged by the imaging of cell structure having the vascular network structure stained.

12. The image processing method according to claim 1, further comprising:
subjecting cells having the vascular network structure to fluorescent modification in advance such that the vascular network structure is stained before the image is acquired; and
imaging a cell structure having the vascular network structure stained,
wherein the acquiring of the image includes acquiring an image imaged by the imaging of cell structure having the vascular network structure stained.

13. The image processing method according to claim 1, further comprising:
conducting immunostaining and fluorescent modification such that the vascular network structure is stained before the image is acquired; and
imaging a cell structure having the vascular network structure stained, wherein the acquiring of the image includes acquiring an image imaged by the imaging of cell structure having the vascular network structure stained.

14. The image processing method according to claim 1, wherein the cell structure includes vascular endothelial cells.

15. The image processing method according to claim 1, wherein the generating of the adjusted image reduces the noise of the removed image by increasing a difference between pixel values of pixels in the removed image while maintaining distribution of the pixel values of the pixels and subtracting a predetermined pixel value.

16. The image processing method according to claim 1, wherein the generating of the removed image by removing background signals is performed using a rolling ball method or a sliding paraboloid method, and the generating of the adjusted image reduces the noise by increasing a difference between pixel values while maintaining distribution of the pixel values and subtracting a predetermined pixel value.

17. The image processing method according to claim 1, wherein the generating of the adjusted image reduces the noise by increasing a difference between pixel values while maintaining distribution of the pixel values and subtracting a predetermined pixel value, and the applying of the wavelet transform is performed using a Mexican hat filter.

18. The image processing method according to claim 1, wherein the image is an image of a region including a center of the cell structure, and the generating of the adjusted image reduces the noise by increasing a difference between pixel values while maintaining distribution of the pixel values and subtracting a predetermined pixel value.

19. The image processing method according to claim 1, wherein the generating of the removed image by removing background signals is performed using a rolling ball method or a sliding paraboloid method, the generating of the adjusted image reduces the noise by increasing a difference between pixel values while maintaining distribution of the pixel values and subtracting a predetermined pixel value, and the applying of the wavelet transform is performed using a Mexican hat filter.

20. A non-transitory computer-readable medium stored thereon a program that when executed, causes a computer to execute an image processing method comprising:

acquiring an image in which a cell structure having a stained vascular network structure is imaged;

converting the image to an image with a predetermined gradation;

generating a removed image by removing background signals from the image with the predetermined gradation;

generating an adjusted image by reducing noise of the removed image;

applying a wavelet transform to the adjusted image such that a contour image in which contours of the vascular network structure are extracted is generated;

repeatedly excluding object pixels from object boundaries recognized in the contour image such that a skeleton image in which skeletons having a line width of a predetermined number of pixels are extracted is generated; and generating an extracted image in which skeletons drawn in the skeleton image whose length is greater than a threshold are extracted.

* * * * *